July 7, 1959 R. W. CORY 2,894,203
MULTIPLE FREQUENCY EDDY CURRENT TESTING APPARATUS
Filed April 11, 1957 2 Sheets-Sheet 1

INVENTOR.
ROBERT W. CORY
BY
Oldham & Oldham
ATTYS.

July 7, 1959 R. W. CORY 2,894,203
MULTIPLE FREQUENCY EDDY CURRENT TESTING APPARATUS
Filed April 11, 1957 2 Sheets-Sheet 2

INVENTOR.
ROBERT W. CORY
BY
*Oldham & Oldham*
ATTYS.

United States Patent Office 2,894,203
Patented July 7, 1959

2,894,203
MULTIPLE FREQUENCY EDDY CURRENT TESTING APPARATUS

Robert W. Cory, Ravenna, Ohio

Application April 11, 1957, Serial No. 652,121

9 Claims. (Cl. 324—40)

This invention relates to apparatus for testing tubes, bars and other work pieces in which flaws or other characteristics of the work pieces are determined by variations in eddy current flow and other electrical factors in the work pieces, and, more particularly, to apparatus of this type utilizing multiple testing frequencies.

It is the general object of my invention to provide testing apparatus of the eddy current type and characterized by automatic multiple frequencies techniques which produce improved and more complete test results.

Another object of the invention is the provision of eddy current testing apparatus in which during the movement of the work piece through the apparatus the work piece is subjected to a relatively large number of distinct and different frequencies so that flaws or characteristics of the work piece best responding to a particular frequency can be located or determined.

Another object of my invention is to provide eddy current testing apparatus characterized by versatility, simplicity, low initial cost, long life, freedom of maintenance and broad scope of test results.

Another object of my invention is to provide eddy current testing apparatus utilizing a plurality of test frequencies and having associated means for identifying numerically the exact frequencies giving best or most indicative test results on a particular work piece or work pieces.

The foregoing objects of my invention, and other objects which will become apparent as the description proceeds, are achieved by providing eddy current testing apparatus including a transformer usually having primary coil means and secondary coil means, the transformer being adapted to movably receive as a core a work piece to be tested, means connected to the primary coil means and progressively and continuously subjecting the work piece to a plurality of different high frequencies of eddy current flow during the movement of the work piece in relation to the transformer, and means connected to the secondary coil means for indicating a flaw in or a characteristic of a work piece movably positioned as a core in the transformer.

The invention teaches the use of a high frequency oscillator over a relatively wide range, a high frequency harmonic generator, double throw switch means connected to the primary coil means of the transformer, means connecting the oscillator to one side of the double throw switch and means connecting the generator to the other side of the double throw switch whereby either the oscillator or the generator is connected to the primary coil means.

The invention likewise preferably includes a marker means for identifying substantially the exact frequency of the harmonic generator which has best indicated a flaw or other characteristic of the work piece tested.

For a better understanding of my invention, reference should be had to the accompanying drawings wherein—

Figure 1:
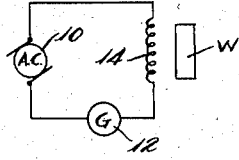
Figs. 1, 2 and 3 are schematic wiring diagrams indicating the several basic types of eddy current testing apparatus.

In the drawings, Fig. 1 represents a basic apparatus for eddy current testing and including an alternating current generator 10 electrically connected by way of a galvanometer 12 to a coil 14. When a work piece W is placed adjacent coil 14, any flaws or other physical changes in the characteristics of the work piece result in eddy current changes which can be detected as changes in voltage or current in galvanometer 12.

Figure 2:
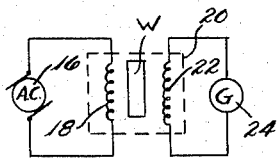

In Fig. 2 is shown a somewhat improved eddy current testing apparatus in which an alternating current generator 16 connects to the primary coil 18 of a transformer 20 having a secondary coil 22 connected to a galvanometer 24. The transformer 20 is so constructed that the work piece W functions in part as the core of the transformer so that eddy currents are introduced into it, changes in the eddy current result due to flaws or other changes in the characteristics of the work piece as it is moved through the transformer, and with these changes in characteristics being indicated by the galvanometer 24.

Figure 3:
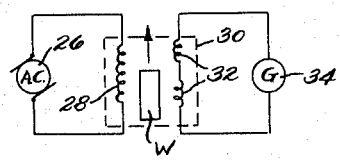

The null apparatus shown in Fig. 3 includes an alternating current generator 26 connected to the primary 28 of a transformer 30 having opposed secondary coils 32 connected to a galvanometer 34 whereby movement of a work piece W through the transformer 30 results in changes in eddy current flow in the work piece due to flaws or other changes in the characteristics of the work piece and with the changes being indicated in the galvanometer 34.

Figure 4:
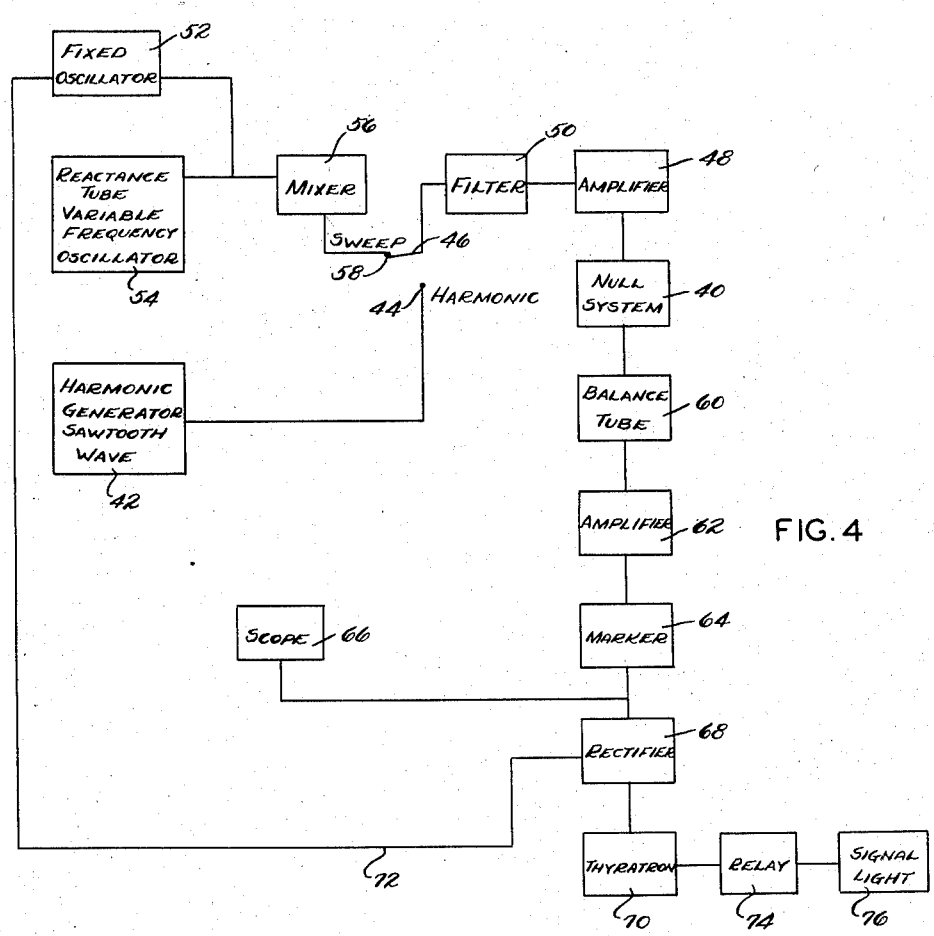
Fig. 4 is a schematic box diagram of the eddy current testing apparatus of the present invention.

The form of the invention illustrated in Fig. 4 basically utilizes the null system of Fig. 3, the apparatus of the null system being diagrammatically indicated by box 40 of the box diagram. As heretofore indicated, I provide apparatus for supplying a plurality of frequencies to the null system 40, and such multiple frequency supplying apparatus takes two forms. First, it constitutes a harmonic generator of a sawtooth wave, indicated by box 42 which is electrically connected to a contact 44 of a double throw switch 46, the generator 42 functioning to simultaneously supply alternating current at a plurality of high frequencies, as between 10 kilocycles and 100 kilocycles to the null system 40 by way of amplifier 48 and filter 50 when the switch 46 is thrown to close with contact 44.

I also provide mechanism for applying to the null system 40 high frequency alternating current in which the frequencies are continuously and rapidly varied between say 10 kilocycles and 100 kilocycles. Mechanism to provide sweep frequencies of the character described include a fixed oscillator 52 and a reactance tube variable frequency oscillator 54, both being connected by a mixer 56 to a contact 58 of the double throw swtich 46.

Suitable means are connected to the output of the null system 40 for indicating the eddy current variations in the work pieces tested, and these means include in the embodiment of the invention illustrated a balance tube 60, amplifier 62, a frequency marker 64, and associated oscilloscope 66, a rectifier 68, a thyratron 70 electrically connected by a lead 72 to the fixed oscillator 52, a relay 74 connected to the output of the thyratron 70, and a signal light 76.

Figure 5:
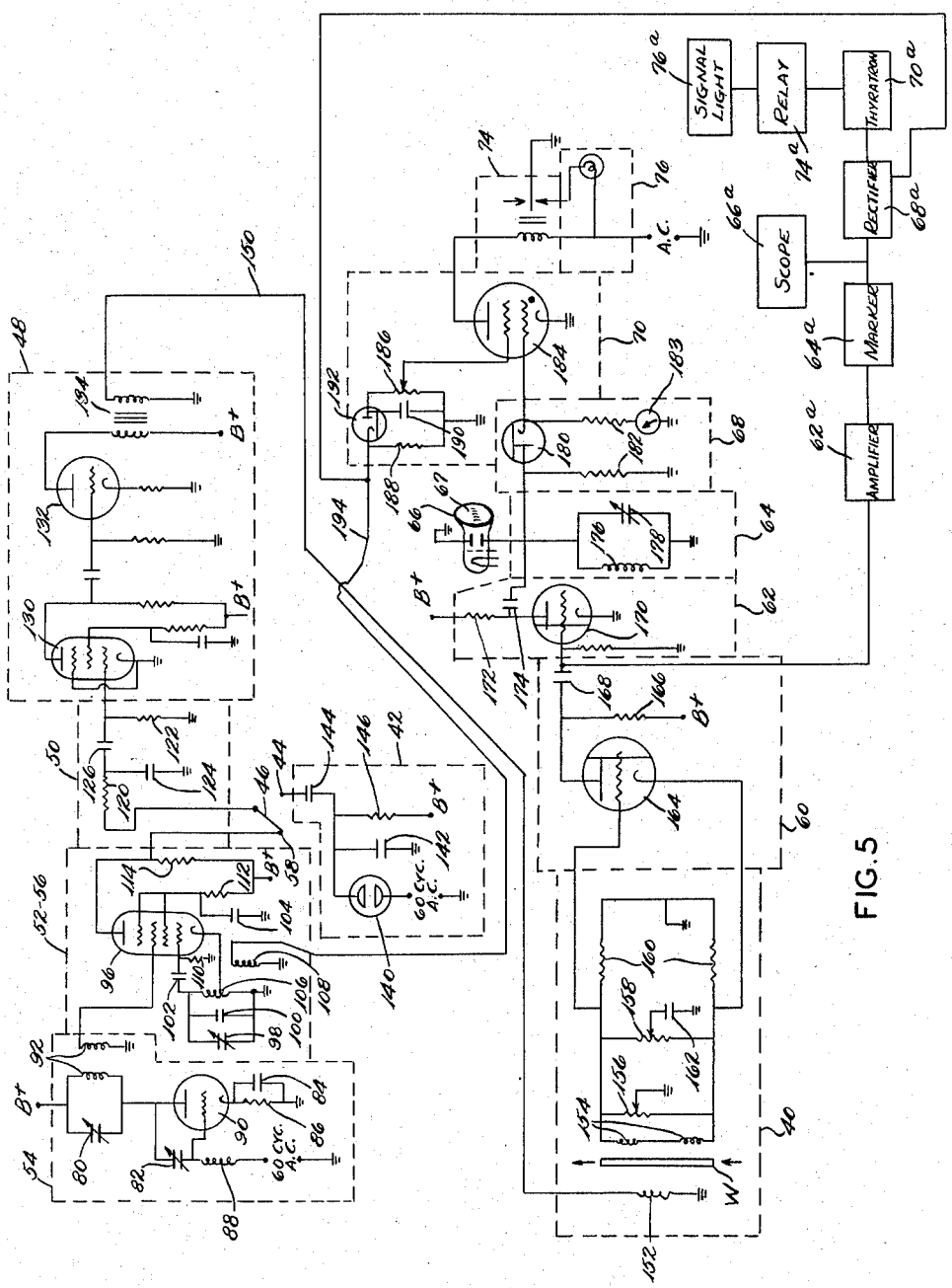
Figure 5 is a wiring diagram of the apparatus of Fig. 4.

The more detailed wiring diagram of Fig. 5 includes, of course, the boxes of Fig. 4, the boxes being indicated by dotted lines, and being given the same numerals as in Fig. 4. It will be understood that with respect to many of the boxes of Fig. 4, the exact wiring diagrams are well known to those skilled in the art, and in some instances may take a variety of form. In Fig. 5, I have given a typical example of the circuitry of the various boxes of Fig. 4, although it will be recognized that with respect to conventional units such as amplifiers, oscillators, rectifiers, filters, relays, null system and the like that the circuitry given is exemplary only.

More particularly, in Fig. 5, the variable frequency oscillator 54 can typically include variable condensers 80 and 82 (10–100 mmfd.), condenser 84 (5000 mmfd.), resistance 86 (500 ohms), coil 88 (4–29 mh.), tube 90 (6AQ5), and primary-secondary coil 92 (0.12 mh.). The variable frequency oscillator 54 is adapted to generate a sweep of frequencies, and in the embodiment shown the frequencies generated are swept rapidly and repeatedly between 2010 kilocycles and 2100 kilocycles.

The fixed oscillator 54 and mixer 56 together include a tube 96 (6BE6), variable condenser 98 (5–25 mmfd.), fixed condenser 100 (33 mmfd.), fixed condenser 102 (40 mfd.), fixed condenser 104 (500 mmfd.), coil 106 (0.12 mh.), coil 108 (0.12 mh.), resistance 110 (27K ohms), resistance 112 (15K ohms) and resistance 115 (27K ohms).

It is the purpose of the fixed oscillator and mixer to subtract from the variable frequency oscillator 54 2000 kilocycles, and to leave the output of the mixer an electric voltage constantly varying between 10 and 100 kilocycles.

The high and low pass filter 50 includes a resistance 120 (200K ohms), a resistance 122 (500K ohms), a fixed condenser 124 (50 mmf.), and a fixed condenser 126 (200 mmf.). It is the purpose of the filter 50 to attenuate frequencies above and below the 10 to 100 kilocycle limits referred to heretofore.

Amplifier 48 includes tube 130 (6AU6), tube 132 (6S4), transformer 134, and resistance and fixed condenser values of known and standard amount.

The box 42 for generating harmonic frequencies in sawtooth form includes tube 140 (NE51), condenser 142 (20,000 mmf.), condenser 144 (5000 mmf.), and resistance 146 (2.2 megohms), and is connected to contact 44 of double throw switch 46, the other contact 58 of switch 46 being connected to the output of the mixer 46.

The output of amplifier 48 is connected by a lead 150 to the primary coil means 152 of the null transformer which has opposing secondary coil means 154. It is also possible, of course, and often preferable, to connect the lead 150 directly between the secondary coils 154 and eliminate the primary 152. In this case, the coils 154 form an impedance bridge and there is no null transformer but rather a null system which is provided. The work piece W being tested is adapted to be moved in the direction shown in the arrows through the null transformer, as will be understood. Completing the null system 40 is a balancing potentiometer 156 (1000 ohms), a balancing potentiometer 158 (1000 ohms), resistances 160 (100 ohms), and fixed condenser 162 (10,000 mmfd.).

The output of the null system 40 is connected to balance tube circuit 60 including tube 164 (12A27), a resistance 166 (100K ohms), and a fixed condenser 168 (5000 mfd.).

It should be understood that coils 154 are made as opposite but duplicate coils. However, no coils can be made exact duplicates and the circuitry shown is to effect exact balancing between the coils. The balancing tube 164 passes no current with the coils balanced and only becomes conductive when the coils 154 become unbalanced due to presence of a flaw or physical change in the work piece adjacent one of the coils.

Amplifier 62 includes a tube 170 (12A27), a resistance 172 (100K ohms), and a condenser 174 (5000 mmfd.). Actually tubes 164 and 170 are in a common envelope with tube type 12A27 being a double tube.

Marker circuit 64 includes an inductance 176 and a variable condenser 178 capable of being tuned over the range of frequency of the output of the null system.

It is the function of the marker circuitry 64 to be used particularly in conjunction with the generator 42 to provide an exact indication of the output frequency indicating a flaw or other physical characteristic of a work piece being tested. It will be understood, in this connection, that variable condenser 178 is calibrated in terms of frequency, and when the circuit 176—178 is tuned to synchronize the flaw detecting frequency that the matching frequency can then be read directly from the variable condenser 178. When the marker circuit is in tune with the flaw frequency a larger pip shows on the oscilloscope or a greater indication on the test meter is indicated, all as hereinafter described.

Electrically associated, in the manner shown, with the amplifier 62 and marker 64 is a cathode ray oscilloscope 66 on which the amplified output of the null system 40 is visually indicated. With switch 46 on contact 44 to connect harmonic generator 42 to the input side of the null system 40, the cathode ray oscilloscope 66 shows a harmonic wave form in which additional pips on the wave form indicate flaws or other physical characteristics of the work piece W. Turning the marker circuit 64 into synchronism with the frequency of the pip will increase its size and the frequency can be read from variable condenser 178.

When switch 46 is thrown to contact 58 to connect the sweep circuit to the input of the null system 40, then an error or other physical change in the work piece W will again be reflected as a pip on the oscilloscope 66, but in this case, it is usually possible to calibrate the front of the oscilloscope in terms of change in frequency from left to right, as shown at 67, and to locate the frequency of the pip by its position on the calibrated scale.

Rectifier 68 includes tube 180 (½ of 6AL5), and resistances 182 (100K ohms). A galvanometer 183 is connected in the ground circuit of the rectifier output and this meter will indicate in terms of degree a flaw or change of physical characteristics of the work piece W.

Thyratron circuitry 70 includes tube 184 (type 2050), sensitivity potentiometer 186 (100K ohms), resistance 188 (100K ohms), fixed condenser 190 (5000 mmfd.), tube 192 (½ of 6AL5), and a connection 194 extending to inductance 108 which is positioned in inductive relationship with inductance 106 of oscillator 52.

Thyratron 70 has its output connected to relay 74 and with lamp 76 being adapted to be operated from the A.C. power source shown when relay 74 closes upon the firing of the thyratron 184. Of course, the thyratron acts as an electronic relay to fire, i.e., close, when the voltage passed to it exceeds the value set by the sensitivity potentiometer 186.

It is believed that the operation of the apparatus will be understandable from the foregoing description. Suffice it to say here that when a work piece W is to be tested by passing it between the primary coil means 152 and the secondary coil means 154 of the null system 40, that the double throw switch 46 is positioned either on contact 44 to connect the harmonic generator 42, or on contact 58 to connect the sweep generator to the input or primary coil 152 of the null system 40. With the switch 46 on contact 58, the work piece W is subjected to induced magnetic fields creating voltage flows in the secondary coil means 154, the magnetic fields and resulting flows being at rapidly changing frequencies, as from 10 kilocycles to 100 kilocycles, the sweep oscillator periodically repeating the frequency sweep many times a second (120 times a second in the embodiment of the invention illustrated) so that the work piece W is subjected to a large plurality of frequencies over every portion of its length. In a like manner, if the switch 46 is connected to the contact 44, the harmonic generator 42 produces simultaneously a plurality of frequencies to which the work piece is subjected between the primary coil means 152 and the secondary coil means 154.

An important feature of the inventive concept is to provide one or more additional marker circuits for frequency comparison. In Fig. 5 of the drawings only one such additional circuit has been shown as including amplifier 62a, marker 64a, scope 66a, rectifier 68a, thyratron 70a, relay 74a and signal light 76a, however, still additional duplicate circuits could be provided. By the use of several marker circuits as described any differences of amplitude at specific frequencies can be amplified and disassociated whereby dimensional changes can be more readily distinguished from physical flaws.

It can be pointed out here that the frequency of the alternating current in a null transformer or any eddy current testing system effects the sensitivity of the system to various types of flaws or physical changes in the work piece tested. Non-magnetic objects produce very little effect on low frequency current, and the depth of penetration into a conductor by the high frequency current is determined by the skin effect which appears to be a function of frequency. In the case of testing bars and tubes for defects, it has been found that the size, shape, depth and kind of defect present is best indicated at a particular frequency. The fact that each variation physically of a work piece may require a different frequency to produce maximum variation in the eddy current system means that the present apparatus gives particularly improved advantages over all known single frequency eddy current test systems. In testing a length of bar stock, for example, there may be several types of defects, as well as hardness and dimensional changes, each requiring a different frequency for maximum indication. It is also possible for an operator, as he becomes skilled in working with the present apparatus, to know what type or kind of variation is present in the work piece when the variation produces a maximum response at a specific frequency. It has been found that higher frequencies produce more response to dimensional changes for example.

One of the further advantages of the apparatus of the invention is the fact that it automatically adapts itself by the plurality of frequencies utilized to best detect a wide variety of defects or physical changes in the work piece. For example, the improved apparatus is able to measure conductivity in the presence of variations of geometry of the work piece, and the present apparatus is particularly adapted to the detection of several different types of defects or variations along a single length of the work piece.

Summarizing, it can be said that the present apparatus provides the optimum frequency automatically to identify and discover a wide variety of physical defects or physical changes in a work piece at all times and without special attention from the operator.

The term null system as employed in the claims is intended to include impedance bridge and/or transformer balancing means, as well as difference coil combinations which are another name for impedance bridges.

While in accord with patent statutes one best known embodiment of the invention has been specifically illustrated and described, it is to be particularly understood that the invention is not limited thereto or thereby, but that the scope of the invention is defined in the appended claims.

I claim:

1. Eddy current testing apparatus including a pair of opposed coils, said coils being adapted to be positioned in inductive relationship with a work piece to be tested, a high frequency oscillator, automatic means for continuously and repeatedly varying the frequency of the oscillator over a relative wide range, means connecting the output of the high frequency oscillator to the coils and continuously subjecting the work piece to the plurality of different and varying high frequencies of eddy current flow, and means connected to the opposed coils for indicating a flaw in the work piece tested.

2. Eddy current testing apparatus including transformer means having a primary coil and a pair of opposed secondary coils, said transformer means being adapted to movably receive as a core a work piece to be tested, automatic means connected to the primary coil and subjecting the work piece progressively and continuously to a plurality of different high frequencies of eddy current flow during the movement of the work piece in relation to the transformer means, means connected to the opposed secondary coils for indicating a flaw in a work piece movably positioned as a core in the transformer means, said indicating means including a tunable calibrated marker circuit which can be brought into synchronism with an output frequency of the transformer means best responding to a physical characteristic of the work piece.

3. Eddy current testing apparatus including transformer means, said transformer means being adapted to receive as a core a work piece to be tested, automatic means connected to the transformer means and subjecting the work piece progressively and continuously to a plurality of different high frequencies of eddy current flow, and means connected to the transformer means for indicating a flaw in a work piece positioned as a core in the transformer means.

4. Eddy current testing apparatus including a null system having a pair of opposed coils, said null system being adapted to receive as a core a work piece to be tested, a high frequency oscillator, means for continuously varying the frequency of the oscillator over a relatively wide range, means connecting the output of the oscillator to the null system to induce eddy current flow in the work piece, and means connected to the opposed coils for indicating a flaw in a work piece positioned as a core in the opposed coils.

5. Eddy current testing apparatus including a null system having a pair of opposed coils, said null system being adapted to receive as a core a work piece to be tested, a high frequency harmonic generator providing a plurality of frequencies simultaneously and connected to the null system to induce eddy current flow in the work piece, and means connected to the opposed coils for indicating a flaw in a work piece positioned as a core in the opposed coils.

6. Eddy current testing apparatus including means for inducing high frequency eddy currents in a work piece to be tested, said means having mechanism adapted to subject each portion of the work piece progressively and continuously to a large plurality of different frequencies covering all ranges between about 10 and about 100 kilocycles, and means inductively connected to the work piece for indicating a change in eddy current flow therein and a physical change in the work piece.

7. The combination defined in claim 6 including in the indicating means an oscilloscope having a face calibrated in frequencies.

8. Eddy current testing apparatus including null system means having a pair of opposed coils, said null system means being adapted to receive as a core a work piece to be tested, a high frequency harmonic generator connected to the null system means and providing a plurality of frequencies simultaneously to the null system, and means connected to the opposed coils for indicating a flaw in a work piece positioned in inductive relation with the null system means, said indicating means including at least one tunable calibrated marker circuit which can be brought into synchronism with an output frequency of the null system means best responding to a physical characteristic of the workpiece.

9. Eddy current testing apparatus including null system means having a pair of opposed coils, said null system means being adapted to movably receive as a core a work piece to be tested, means connected to the null system means and progressively subjecting the work piece to a plurality of different high frequencies of eddy current flow during the progressive movement of the work piece in relation to the null system means, means connected to the opposed coils for indicating a flaw in a work piece movably positioned as a core in the null system means, said indicating means including an electronic relay for operating a signal light when the output voltage of the null system means indicates an objectionable flaw in the work piece.

References Cited in the file of this patent

UNITED STATES PATENTS

| | | |
|---|---|---|
| 1,954,996 | Hehn | Apr. 17, 1934 |
| 2,005,011 | Spec | June 18, 1935 |
| 2,337,231 | Cloud | Dec. 21, 1943 |
| 2,483,471 | Mann et al. | Oct. 4, 1949 |
| 2,489,920 | Michel | Nov. 29, 1949 |
| 2,495,627 | Bovey | Jan. 24, 1950 |
| 2,806,992 | Foerster | Sept. 17, 1957 |